United States Patent [19]
Coulter et al.

[11] 3,890,568

[45] June 17, 1975

[54] METHOD AND APPARATUS FOR PARTICLE LENGTH MEASUREMENT

[75] Inventors: Wallace H. Coulter, Miami Springs; Walter R. Hogg, Miami Lakes, both of Fla.

[73] Assignee: Coulter Electronics, Inc., Hialeah, Fla.

[22] Filed: Nov. 6, 1972

[21] Appl. No.: 304,127

[52] U.S. Cl. .......................... 324/71 CP; 235/92 PC
[51] Int. Cl. ............................................ G01n 27/00
[58] Field of Search ................ 324/71 CP; 328/111; 235/92 PC

[56] References Cited
UNITED STATES PATENTS
2,623,994  12/1952  Von Baeyer ........................ 328/111
3,441,848  4/1969  Valley et al. .................... 324/71 CP

*Primary Examiner*—Alfred E. Smith
*Assistant Examiner*—Ernest F. Karlsen
*Attorney, Agent, or Firm*—Silverman & Cass

[57] ABSTRACT

Particle sizing method and apparatus according to the teachings of the Coulter principle are improved for purposes of determining the length of long particles by measuring each particle-produced pulse at a specific percentage of its maximum amplitude, such as one-half maximum amplitude, and employing the duration at such specific amplitude percentage as a measure of particle length. Embodiments are provided for measuring particle populations in which the different long particles are assumed to possess:

1. the same cross sections (perpendicular to the longitudinal axis): or
2. randomly different cross sections; and
3. in which the different particles traverse the scanning ambit with speeds related to their length.

29 Claims, 6 Drawing Figures

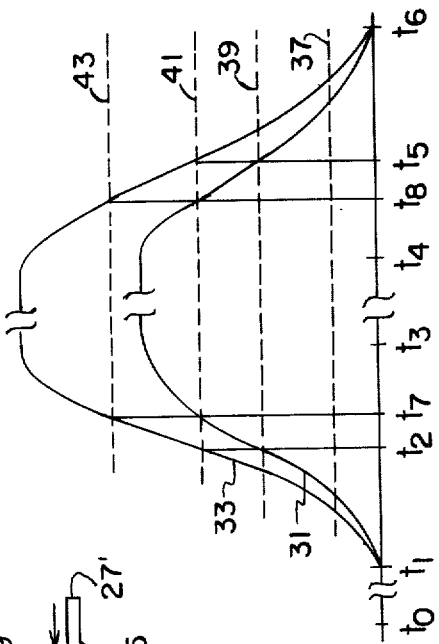
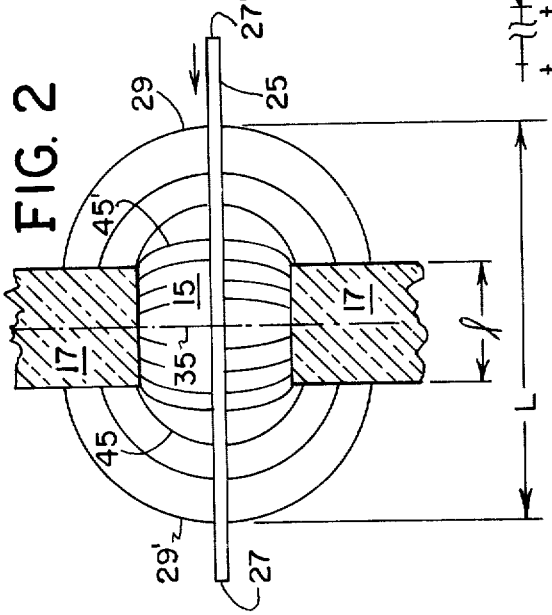
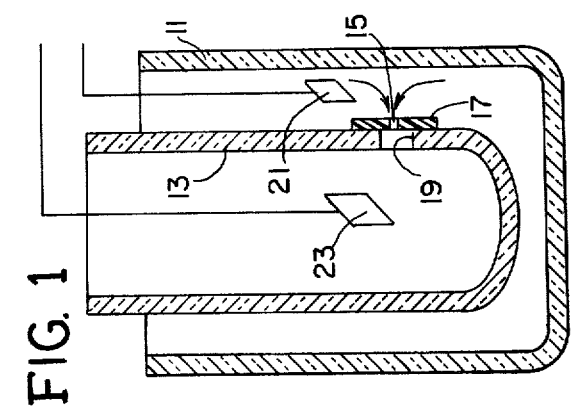
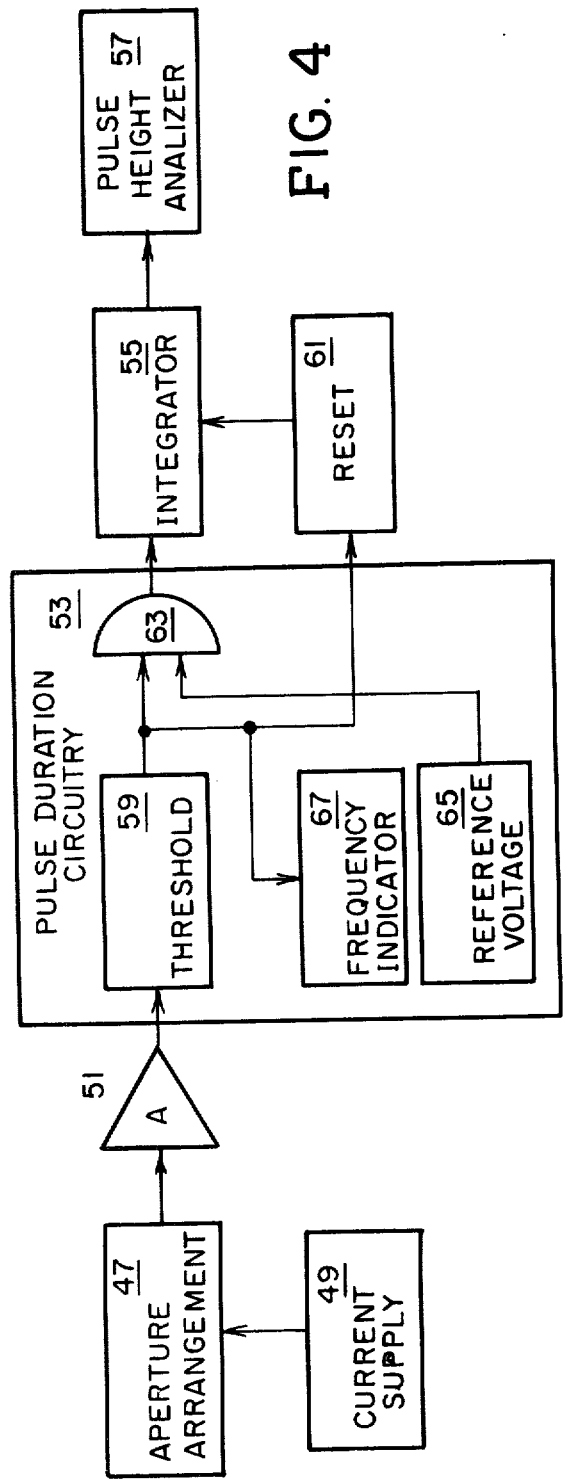

METHOD AND APPARATUS FOR PARTICLE LENGTH MEASUREMENT

BACKGROUND OF THE INVENTION

This invention concerns the measurement of the lengths of microscopic particles by electronic, non-optical methods and apparatuses. More specifically, this invention is directed to improved methods and apparatuses which practice the teachings of the Coulter principle of particle analysis and specifically measure particle length by measuring particle-pulse duration.

Since its conception, more than 20 years ago, the Coulter principle has been the progenitor of numerous methods and apparatuses for the electronic counting, sizing and analysis of microscopic particles, which are scanned in a fluid suspension. The basic scanning structure is set forth in U.S. Pat. No. 3,656,508; and significant improvements are taught in U.S. Pat. No. 3,259,842.

In the structure described in said patents, an aperture is provided in the wall of an insulated vessel, for example, adjacent the bottom end of a glass test tube, the aperture being of the order of several to several hundred microns in diameter and also in path length, depending upon the nature of the particles being studied. A suspension of the particles is prepared having a known dilution in a suitable liquid, the electrical impedance of which is different from that of the particles. Another preferably insulated vessel, such as a glass beaker, is provided with a quantity of the suspension, the aperture of the first vessel being submerged in the suspension in the second vessel and the aperture providing the only fluid communication between the two vessels. A pressure differential is established between the two vessels so that the suspension will pass through the aperture from the second or outer vessel to the first or inner vessel. Where the apparatus is intended to count the particles, the rate of flow is known or ascertainable.

An electric current flow is established between the two vessels by suspending electrodes in the respective bodies of the suspension. Since the only fluid connection between the two bodies is through the aperture, an electric current flow and field is established in the aperture. This aperture and the resultant constructed electric field in and around it constitute a scanning ambit or sensing zone.

The particles may be microscopic or macroscopic, and may comprise blood cells, bacteria, and many other organic or biological particles; or may comprise inorganic particles such as alumina, metal powders, ink, mud, petroleum catalysts, and the like. The only requirement is that the particles be small enough to pass through the aperture along with the suspending fluid, and that their impedance per unit volume and that of the fluid are or can be made detectably different.

As each particle passes through the aperture, for the duration of the passage, the impedance of the contents of the aperture will change, thereby modulating the current flow or electric field in the aperture, and hence causing the generation of a signal to be applied to a detector suitably arranged to respond to such change. A common arrangement is to have the signal thus developed applied to the input of an amplifier which in turn drives some form of indicating or measuring or recording device. This would include display counters, cathode ray tubes, recording counters and writing devices.

It has been proven that the change in impedance of the contents of the aperture as a particle passes through it is proportional to the volume of the particle, where the cross sectional area of the particle is substantially smaller than the cross sectional area of the aperture, and the particle is smaller in diameter than the axial length of the aperture. Accordingly, numerous embodiments of commercial particle analyzers have been developed which measure the signal amplitude output of a Coulter scanning arrangement, for the purpose of measuring particle volume.

As might be implied, the duration of the passage of the particle through the aperture is the duration of the impedance change which produces the particle signal. Hence, the particle signal duration should be related to the length of the particle. For example, two particles moving through the aperture path at the same speed will produce the same amplitude and duration signals if the particles are of the same size. However, if one particle is longer than the other, its leading end will arrive sooner, and its trailing end will depart the sensing zone later, producing a longer pulse, even assuming both have the same velocity. If the residence time in the aperture is a measure of particle length, then signal duration and particle length are monotonically related. Such is the premise of the invention disclosed in U.S. Pat. No. 3,441,848, and although such premise is useful, it requires several assumptions and constraints.

Particularly limiting to the use of the invention disclosed in U.S. Pat. No. 3,441,848 is the exclusion of signal amplitude in the measurement of particle length. It is well known that two particles of the same length, but of different volumes, will produce scanning pulses of different amplitudes. Pulses of different amplitudes, because of their sloping leading and trailing edges, will exceed a given counting threshold at different times; hence, the duration of a pulse is poorly defined and alone cannot universally be relied upon accurately to distinguish particle length.

BRIEF SUMMARY OF THE INVENTION

The present invention recognizes that particle pulse amplitude is a necessary parameter in particle pulse analysis for the measurement of particle length. Also recognized is the fact that particle length is only one of several parameters of a particle and the measuring arrangement which contributes to the variations in the scanning pulse duration.

The embodiments of this invention employ the derived pulse amplitude, at a specific value of maximum amplitude, for attaining a pulse duration measurement that is an accurate measure of particle length, independent of particle cross section. Embodiments of the invention also take into consideration the fact that longer particles move more slowly through the aperture path, in proportion to their length. The invention further recognizes that the physical dimensions of the aperture do not define the electronic scanning ambit of the Coulter type of scanner and that a more sophisticated appreciation is required. Such scanning ambit is discussed in U.S. Pat. No. 3,668,531.

BRIEF DESCRIPTION OF THE DRAWINGS

FIG. 1 is a diagram of a Coulter type of particle scanning arrangement;

FIG. 2 is a diagrammatic representation of the profile of a scanning aperture, a particle passing therethrough and the isopotential lines of the scanning ambit;

FIG. 3 is a view of a pair of pulses as if generated by two different volume particles of the same length;

FIG. 4 is a block diagram of a simplified embodiment of the invention;

DESCRIPTION OF THE PREFERRED EMBODIMENTS

Figure 5:
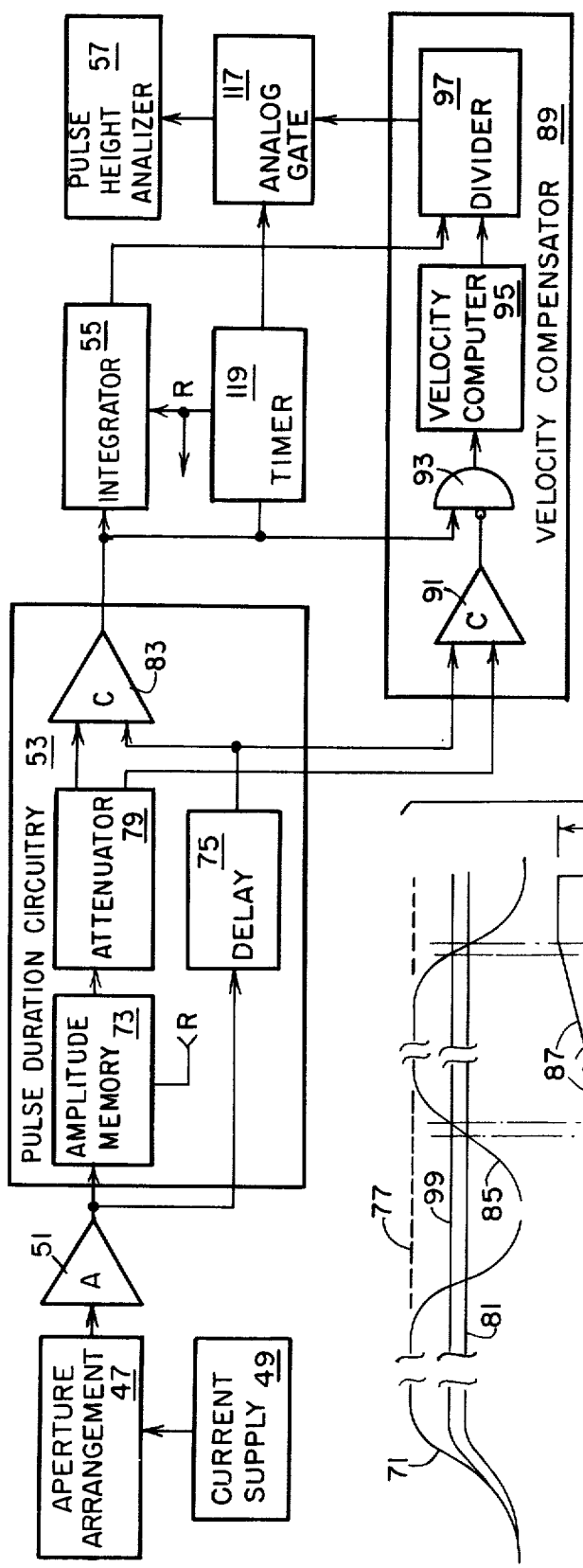
FIG. 5 is a block diagram of a more sophisticated embodiment of the invention.

FIG. 1 illustrates diagrammatically a typical Coulter particle scanning arrangement having: an outer vessel 11, an inner vessel or aperture tube 13, both of insulative material; a microscopic aperture 15 through a wall of the aperture tube, the aperture usually formed in a wafer 17 mounted over an orifice 19 in the aperture tube; and a pair of electrodes 21 and 23 one in each of the vessels and proximate the aperture. A suspension of particles is put into the outer vessel with sufficient volume to immerse at all times the aperture and the electrodes. The suspension fluid is an electrolyte having an impedance different than that of the particles. By apparatus not shown in FIG. 1, but well known in the art, a metered quantity of the particle suspension is caused to flow from the outer vessel 11 through the aperture 15 and into the inner vessel 13. At the same time, an electric current source (not shown) provides a flow of electric current through the aperture; whereby, there results a modulation of the electric current in and around the aperture during the passage of individual particles through the aperture 15. Such modulation is proportional to particle size and volume and provides detectable signal pulses that can be processed by various electronic circuits for purposes of particle counting, sizing and other particle parameter analysis. The basic operation of a Coulter type of scanning arrangement is detailed in the earler cited patents and now is well known in the art.

The aperture 15 is sized to have a diameter relative to the diameter of the particles. A ratio having an upper limit of about 5 or 10:1 between the aperture and particle diameters has provided reliably accurate scanning pulses while at the same time allowing sufficient physical clearance for particle movement so as to reduce the instances of aperture blockage by oversized particles, plural particles in the aperture at one time and debris which might be in the suspension fluid. For example, in the analysis of blood particles which have diameters ranging from small platelets to much larger lymphocytes, an aperture of 100 microns would be suitable. Experience has shown that the ratio between aperture length to diameter is a compromise between conflicting criteria such as signal-to-noise ratio, volume resolution and the probability of including more than one particle in a measurement. This "aspect ratio" is commonly chosen to approximate 3:4; i.e., with the length equal to 0.75 of the diameter of the aperture. Such a physical relationship is illustrated in the greatly magnified view of FIG. 2.

As shown in FIG. 2, the wafer 17 is pierced by the aperture 15, and a particle 25 is moving from right to left through the aperture path, with the leading and trailing edges 27 and 27' of the particle being positioned external the aperture length 1 and also external the length L of the scanning ambit. As discussed in U.S. Pat. No. 3,668,531 the effective scanning ambit, or range within which a particle is sensed, extends beyond the physical length 1 of the aperture 15 and its diameter. FIG. 2 illustrates a plurality of isopotential lines that represent the changing electric current density in and around the aperture 15. Although it is in two dimensions to simplify the drawing, the actual three dimensional geometry is quite similar. Thus, the isopotential lines such as 29 and 29' should be visualized as sections of isopotential surfaces. Assuming for convenience of explanation that the isopotential lines 29 and 29' define the outer limits of the scanning ambit, then a particle or portion thereof external the ambit of the lines 29 and 29' would not be sensed and would not contribute to the resulting scanning pulse, as next will be discussed with reference to FIG. 3. Actually, there is no definite isopotential line or surface which divides the inside from the outside of the scanning ambit. This is the crux of the problem which the present invention solves.

Considering FIGS. 1, 2 and 3, as the particle 25 moves from the outer vessel 11 to the inner vessel 13 by way of the aperture 15, there will be a period of time during which the particle is external to the scanning ambit, again defined for convenience of explanation by the isopotential line 29; such period of time is shown in FIG. 3 as $t_0$ to $t_1$. At the time $t_1$, the leading edge 27 of the particle 25 crosses the line 29 and initiates the leading edge of a scanning pulse, such as a pulse 31 or a pulse 33. As the particle moves further into the scanning ambit, it crosses more of the isopotential lines, the midpoint of which are spaced increasingly closer to one another up to the central plane 35 of the aperture. Accordingly, the scanning pulse will rise in amplitude until the particle is positioned within the maximum number of isopotential lines. If the particle is shorter than the ambit length L, then the maximum pulse amplitude will occur momentarily when the particle is centered in the scanning ambit (assuming symmetry of the particle with respect to its volume). Such is the general particle position and pulse amplitude relationship now well known in the art, and which enables particle volume to be determined from a measure of pulse amplitude.

However, if as shown in FIG. 2, the particle 25 is longer than the ambit length L, the maximum amplitude will be reached as soon as the leading edge 27 crosses the isopotential line 29' at the time $t_3$ and remain at such maximum until the trailing edge 27' crosses the line 29 at the time $t_4$. Hence pulse amplitude alone cannot be a measure of particle volume, since two long particles of the same cross section, but of differing lengths greater than L will produce the same pulse amplitude, yet have different intervals between the time $t_3$, and $t_4$.

The solution would seem to lie in the measurement of pulse duration and maximum pulse amplitude for measuring the volumes of long particles; whereas, the length of long particles (longer than L) requires the measure of pulse length and total exclusion of pulse amplitude. Such was the approach taught in U.S. Pat. No. 3,441,848, but it lacks a solution to three realistically present problems:

1. a particulate system normally possesses particles of different cross sections;
2. particle velocity is affected by particle length; and 3. even assuming that each individual particulate system contains particles of the same cross section, the measuring method and apparatus must be capable of measuring different particulate systems, each with equal accuracy.

If two particles of the same length but of different volumes are scanned, they would produce, respectively, the pulses 31 and 33 shown in FIG. 3, if their relative cross sections were 2:3. If both particle-pulses are clipped at the same amplitude level, as taught in U.S. Pat. No. 3,441,848, to eliminate the amplitude parameter, the durations of the two clipped pulses would be different. This is easily seen by noting where any one of the levels 37, 39 and 41 are crossed by the leading and trailing edges of the pulses 31 and 33. In each instance, the duration of the pulse 33 would be measured as being longer than that of the pulse 31; hence, the scanning arrangement would report erroneously that the particle generating the pulse 33 is longer than the particle generating the pulse 31. The magnitude of error increases as the clipping level is raised, but at the level 37 just above noise, the error could be especially significant, because the slopes of the leading and trailing edges are so gentle, a small change of clipping level produces a large change in duration.

The present invention is based upon the novel recognition that pulse amplitude cannot be ignored and in fact can be utilized to improve particle length measuring. Analysis has verified that by employing a signal level at a known percentage of the maximum pulse amplitude for any particle-pulse, the duration of the pulse at that signal level is a single-valued function of the total length of the particle. A proof of the just stated inventive recognition requires considerable mathematic development, which is believed unnecessary to present herein. Yet also, the amplitude relationship can be verified empirically and also graphically. A simple, and possible most useful amplitude relationship is graphically presented in FIG. 3, in which the percentage of maximum amplitude is selected as 50 percent; i.e., pulse half-height.

As shown in FIG. 3, the pulse 31 first reaches one-half its maximum amplitude at the time $t_2$ and returns to that level 39 at the time $t_5$. Most importantly, the pulse 33 also reaches its one-half amplitude lvel 41 at the same times $t_2$ and $t_5$. Hence, two particles of the same length, but different volumes (because of their differences in cross sections) traverse the same percentage level of their maximum amplitudes at the same time. Accordingly, the duration $(t_5-t_2)$ is a true measure of their length and is independent of their cross sectional areas.

Of unique significance is the fact that the time $t_2$ corresponds to the position of the leading edge 27 the particle 25 being at the center plane 35 of the aperture, and the time $t_5$ occurs just when the trailing edge 27' passes the center plane 35. Thus, the time span $(t_5-t_2)$ is a measure of the time when the entire particle is passing a specific point and provides a computationally simple measure for the particle length.

It is to be emphasized that the percentage of maximum level can be arbitrarily chosen. As a further example, FIG. 3 shows that the level 41 is at 75 percent of the maximum amplitude of the pulse 31 and that a level 43 is 75 percent of the amplitude of the pulse 33. Clearly, the levels 41 and 43 are crossed by the respective pulses 31 and 33 at the same times $t_7$ and $t_8$, such that the duration $(t_8-t_7)$ is a measure of their lengths which is as valid a measurement as $(t_5-t_2)$. However, the leading and trailing edges 27 and 27' no longer are at the same reference point 35. At the time $t_7$, the leading edge 27 of all particles would (as an example) be crossing the isopotential line 45, and at the time $t_8$ they (again as an example) all would have their trailing edges 27' crossing the isopotential line 45'. Hence, during the duration $(t_8-t_7)$ the particle length measured would lack the fixed distance between the isopotential lines 45 and 45'. Such distance could be added into a final computation which adjusts for the fact that a 75 percent level was employed.

It now should be apparent that if the percentage of maximum amplitude was less than 50 percent, then more than the full length of the particle would be sensed and that the fixed length portion exceeding the true length would be ascertainable by knowledge of the amplitude percentage chosen.

FIG. 4 illustrates a system for carrying out the teachings of the invention. An aperture arrangement 47 and a current supply 49 designate that equipment necessary to produce a scanning output pulse by way of a scanning aperture. If desirable, an amplifier 51 can be provided to amplify the scanner pulse prior to the amplitude-duration processing by pulse duration circuitry 53. The output from the pulse duration circuitry is a pulse having a duration, such as $(t_5-t_2)$ or $(t_8-t_7)$ as above discussed, which is indicative of the time during which a particle-pulse exceeds a voltage level, established by the threshold circuit 59. Such duration is an improved measure of particle length. At the 50 percent amplitude level, signal voltage changes most rapidly with changes in particle position; thus, this level is least subject to error due to slight amplitude variations. An integrator 55 can be employed to convert the pulse duration to a representative amplitude, which is capable of being analyzed by a pulse height analyzer 57 for purposes of particle length distribution studies.

Contrary to the prior art, the pulse height analyzer should not operate linearly in distinguishing between particles of different pulse durations.

It can be verified that the further particles extend beyond the aperture length 1, the slower is the velocity of the surrounding suspending fluid relative to the fluid velocity within the aperture path. Effectively, there results a fluid drag upon the particle which increases with the distance from the aperture. Hence, longer particles will move through the scanning ambit with a lower velocity than shorter particles. The particle velocity relationship to particle length can be determined and then a resulting non-linear function be built into the pulse height analyzer 57, whereby there results an improved analysis of length distribution. FIG. 5 teaches a more sophisticated form of velocity compensator.

The pulse duration circuitry 53, according to the broadest teachings of the invention, can be any electrical arrangement which ascertains the duration of a particle pulse at a percentage of the maximum amplitude of the particle pulse. This does not necessarily require that the actual value of the maximum amplitude be measured or known. The percentage of maximum amplitude can be present, predeterminable, or dynamically determined. The essential feature is that all particles are measured relative to the same percentage of maximum amplitude and that the percentage is known.

In a simple form, the pulse duration circuitry 53 could consist of only a threshold element 59 having its input connected to receive the scanning pulse from the aperture arrangement 47, or the amplifier 51 if one exists, and its output connected to the integrator 55. If, for example, the input to the threshold element 59 is the pulse 31 and the threshold is set at one-half the amplitude of that pulse, the threshold element would produce a generally rectangular output signal for the duration in which the pulse 31 exceeded the threshold level 39, i.e. the duration $(t_5-t_2)$. Such an output signal would be integrated by the integrator 55 in a typical manner to generate a ramp signal, the amplitude of which is a measure of the duration $(t_5-t_2)$, which itself is a measure of the length of the particle that generated the pulse 31. The amplitude output from the integrator 55 then would be fed to the pulse height analyzer 57 which would provide an input amplitude to particle length conversion analysis for each particle. A reset element 61 can be coupled between the threshold element 59 and the integrator 55 for resetting the latter upon termination of the output of the threshold element, in this example at the time $t_5$.

Since the integrator 55 integrates the area bounded by the output from the threshold element 59 and only the duration of that output is a significant parameter, it is necessary for the threshold output to be at a constant level for best results. If the threshold element 59 does not provide a constant enough output, it can be employed as a generator of gating signals to a gate 63 which has coupled to it a constant reference voltage source 65. In this manner of construction, the pulse duration circuitry 53 would feed to the integrator 55 the voltage level from the reference voltage 65 for the duration $(t_5-t_2)$ that the threshold 39 from the threshold element 59 is exceeded by the particle-pulse 31.

The proper percentage setting of the threshold level of the threshold element 59 can be accomplished in many ways, depending upon the manner by which the maximum amplitude is ascertained. If, prior to passing a suspension of particles through the aperture, it is known that all of the particles possess the same cross section and hence will generate pulses having the same maximum amplitude, and also such maximum amplitude is of a known value, then the threshold element 59 can be preset to provide a threshold level whch is a determined percentage of the known maximum pulse amplitude. For purposes of this disclosure, the threshold element 59 can be assumed, in one embodiment of the pulse duration circuitry 53, to possess suitable presetting means. If the particles are known to be of the same cross section, but the maximum amplitude is not known, the maximum amplitude can be ascertained by scanning a small portion of the suspension and using well-known pulse measuring and testing equipment, such as an oscilloscope, to measure the maximum amplitude and then the threshold element is set at the desired percentage.

Rather than actually measure the maximum pulse amplitude for presetting or setting the threshold level, the pulse duration circuitry 53 can include a frequency indicator 67 coupled to the output of the threshold element 59. A simple pulse counter or ratemeter could be employed as the frequency indicator 67 and first would count the number of scanning pulses generated in a fixed period of time and at a very low (just above noise) threshold level setting to obtain the maximum counting rate, for example 10,000 counts in 5 seconds. Then, the threshold would be adjusted upward until the counting rate is one-half the just measured maximum rate. Although the particles are assumed to have the same cross section, they in fact will possess slight differences from the assumed cross section; hence, the threshold value which produces one-half the counting rate will be at a threshold level which is the median of the pulse amplitude maximums. Since the maximum differences are slight, this median will appropriately represent the maximum amplitude of each particle pulse. Thereupon, the threshold element will be adjusted to the desired percentage of median maximum amplitude.

If the cross section of the particles are not known to be the same or are known to be different, then the pulse duration circuitry 53 shown in FIG. 5 can provide the desired percentage of maximum amplitude. The reference number 53 is employed in both FIGS. 4 and 5 to emphasize the fact that the function block 53 is interchangeable in those embodiments.

Figure 6:
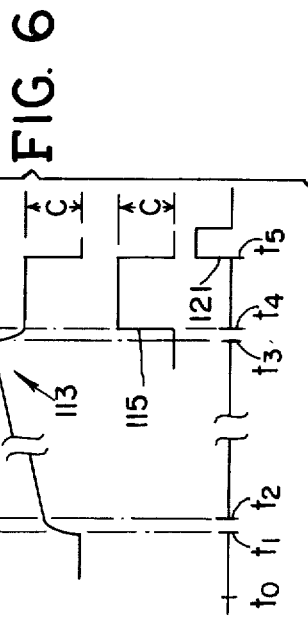
FIG. 6 is a group of waveforms illustrating the operation of the FIG. 5 embodiment.

With reference to FIGS. 5 and 6, each scanning pulse, such as 71, is fed to an amplitude memory element 73 and a delay element 75 in the pulse duration circuitry 53. The amplitude memory can comprise a conventional pulse stretcher (diode-capacitor memory) which follows the leading edge of the pulse 71 to its peak and then stores the peak value as a level 77 until the memory is discharged. An attenuator 79 receives the stored (stretched) pulse 77 and attenuates it to a percentage level 81 of the stored level 77. The attenuated percentage level is the equivalent of the threshold level described with reference to the method and apparatus involved in the embodiments of FIG. 4. The attenuator feeds the percentage level 81 to a comparator 83, while at the same time the delay element 75 is applying to the comparator the pulse 85, which is the pulse 71 delayed for a time sufficient for the memory and attenuation operations.

As shown in FIG. 6, the delayed pulse 85 crosses the percentage level 81 at the time $t_1$ and recrosses it at the time $t_4$;; hence, the comparator will supply to the integrator 55 a constant output signal for the duration $(t_4-t_1)$ and the integrator will generate a ramp signal 87 which increases for that duration and develops the resulting amplitude A. If the amplitude A was applied directly to the pulse height analyzer 57 in FIG. 4, then the "memory" type of pulse duration circuitry 53 shown in FIG. 5 could replace the "threshold" type of circuitry illustrated in FIG. 4, and such interchange is encompassed within the present invention.

In the event that the long particles have significantly differing lengths, or even if the length distribution is not excessive, but a more precise length measurement is desired, there should be considered the velocity of each particle as it passes through the scanning ambit. As stated above, longer particles have lower velocities; hence, they will appear to have lengths greater than they possess, because the output from the pulse duration circuitry 53 will contain an undesirable velocity factor which need not be considered when particles are must shorter than the aperture length.

A velocity compensator 89 is illustrated in FIG. 5 and comprises, in series connection, a comparator 91, a veto AND gate 93, a velocity computer 95, and a divider 97; and its operation requires as an input some measure of the velocity of a particle.

The pulse duration circuitry 53 in FIG. 5 has elements capable of reporting particle velocity. The attenuator 79, in addition to attenuation to the percentage level 81, can provide one or more other attenuations of the particle pulse 71. One such attenuation level 99 is shown in FIGS. 6 and if it is assumed that the level 81 is 50 percent of maximum amplitude of the pulse 71, thhen it can be assumed (for example) that the level 99 is 65 percent of maximum. Once again it should be noted that the actual values of the levels 81 and 99 are not limitations to the invention, but are parameters which are employed.

The comparator 91 is connected to receive and compare the level 99 and the delayed scanner pulse 85 and will generate an output (not shown in FIG. 6) for the duration that the pulse 85 exceeds the level 99; i.e., from $t_2$ to $t_3$. The veto gate 93 receives the outputs from both of the comparators 83 and 91 and, in a manner of operation well known in the art, generates output signals 101 and 103 during the times that the comparator 83 is producing an output and the comparator 91 is not producing an output; as shown in FIG. 6, such times are between $t_1$ and $t_2$ for the signal 101 and between $t_3$ and $t_4$ for the signal 103. It now should be recognized that the durations $(t_2-t_1)$ and $(t_4-t_3)$ are the elapsed times during which the long particle 25 moves relative to the scanning ambit to cause its scanner pulse 71 (delayed as 85) to traverse the 50 to 65 percent levels 81 and 99 both during entry and during exit from the scanning ambit. Since the levels 81 and 99 can be related to positions along the scanning ambit through which the particle passes, a linear distance is defined by the levels 81 and 99 and such distance is traversed by the leading edge of the example particle in the duration $(t_2-t_1)$ and by its trailing edge during $(t_4-t_3)$. Hence, the velocity of the particle has been sampled twice during its passage through the scanning ambit. One or both of the velocity samples can be utilized for velocity compensation purposes by the velocity compensator 89.

The velocity computer 95 could be a rather complex computational arrangement; however, in the present preferred embodiment, an integrator can provide an output which relates to average velocity of the particle during its passage through the scanning ambit. The velocity computer 95 receives from the veto gate 93 the signals 101 and 103 and generates a pair of ramp signals 105 and 107 joined by a plateau level 109. The resulting complex signal 111 possesses an amplitude B that is proportional to the reciprocal of the average velocity of the particle; since the slower the particle, the longer are signals 101 and 103 and thereby the greater is amplitude B. In order to factor velocity out from the length computation, the ramp signal 87 from the integrator 55 must be divided by the complex signal 111 and such is accomplished by the divider element 97, which has inputs from both of the integrators 55 and 95. The resultant of the division action is a waveform 113 having as its final amplitude the amplitude C, which is proportional to particle length, absent particle velocity variables and independent of particle cross section. Hence, the amplitude C is the desired measurement of particle length according to the more sophisticated embodiment of FIG. 5.

The output amplitude C is applied as a signal 115 from the divider 97 to the pulse height analyzer 57 by way of an analog gate 117 that is opened and closed through control by a timer unit 119 for a period of $t_4$ to $t_5$. The timer unit 119 can comprise one or more series connected pulse edge detectors and univibrators that can respond at the time $t_4$ (for example) to the trailing end of the output from the comparator 83. At the time $t_5$ the timer also can generate a reset pulse 121 for resetting the integrator 55 and the amplitude memory 73 in preparation for the next following particle pulse. Since the input to the pulse height analyzer 57 is velocity compensated, in the embodiment of FIG. 5, the analyzer can be linearly responsive to the input amplitudes; whereas, in the preferred form of the analyzer 57 in FIG. 4, the response would have non-linearity to provide velocity compensation.

Throughout the foregoing description, the nature of the particle has not been mentioned, because it is not a controlling limitation to the invention; however, the accuracy of the length measurements depends to some extent upon the length and cross section of the particle. Particles each longer than three times the length of the aperture and of substantially uniform cross section can provide excellent results.

In the event that at least some of the particles are of very short length but do not produce resulting particle pulses of near-zero durations, due to the finite length of the sensing zone the pulse height analyzer 57 can be constructed to respond non-linearly so that near-zero particle length does result in near-zero length measurement.

Although some variations to the method and apparatus according to the invention have been disclosed hereinabove, it is believed that those skilled in the art will be capable of developing modifications also encompassed by the invention and the claims by which the invention is defined.

What is claimed and sought to be protected by the United States Letters Patent is:

1. A method for measuring the length of particles of substantially uniform cross-section which have been electronically scanned by a Coulter type of particle scanning aperture arrangement that generates a particle pulse for each scanned particle, the particle pulses having differing amplitudes depending upon particle volume and cross section, said method comprising the steps of: measuring the time duration that each particle pulse exceeds a known percentage of its maximum amplitude, all particle pulses being measured at the same percentage value, and converting said time duration to a signal parameter which is a measurement of particle length.

2. A method according to claim 1 in which said pulse duration measuring is accomplished by establishing an electrical threshold level for defining said known percentage of maximum pulse amplitude.

3. A method according to claim 2 in which said establishing of the threshold level is accomplished by presetting the threshold level based upon known parameters, such as cross section of the particles prior to the particle scanning.

4. A method according to claim 2 in which said establishing of the threshold level is accomplished by ascertaining the maximum pulse amplitude generated by a sample of the particles and then setting the threshold level to a desired percentage thereof.

5. A method according to claim 2 in which said establishing of the threshold level is accomplished by obtaining, by pulse count frequency determinations, a threshold value related to said maximum amplitude and then setting the threshold level to a desired percentage of such maximum amplitude threshold level.

6. A method according to claim 2 in which said step of converting includes integrating said time duration to generate a signal amplitude proportional to the length of each particle.

7. A method according to claim 6 which includes the further step of compensating for the velocity of the particles relative to the scanning aperture arrangement, said compensating providing a non-linear response to the integrated signal amplitude for effectively decreasing the time duration measurements of particles which move at a lower velocity because of their relative lengths.

8. A method according to claim 1 which includes the further step of compensating for the velocity of the particles relative to the scanning aperture arrangement, said compensating providing a non-linear response to the measured time duration for effectively decreasing the time duration measurements of particles which move at a lower velocity because of their relative lengths.

9. A method according to claim 1 which includes establishing at 50 percent said known percentage of maximum amplitude.

10. A method according to claim 1 which includes establishing said known percentage at a value which causes the measured time duration to encompass the passage of other than the full length of the particles past a reference point in the scanning aperture arrangement.

11. A method according to claim 1 in which said pulse duration measuring is accomplished by attenuating each particle pulse to said known percentage of its maximum amplitude.

12. A method according to claim 11 including detecting each particle pulse maximum amplitude, and in which said attenuating is of the maximum amplitude, and, for attaining said time duration, comparing the thus attenuated maximum amplitude with a delayed waveform of the particle pulse.

13. A method according to claim 12 which includes the further step of compensating for the velocity of the particles relative to the scanning aperture arrangement, said compensating providing a response to the measured time duration for effectively decreasing the time duration measurements of particles which move at a lower velocity because of their relative lengths.

14. A method according to claim 13 in which said step of velocity compensating includes measuring the velocity of a particle at least once while it is being scanned by the aperture arrangement, converting the velocity into the same signal parameter to which the time duration was converted, and factoring the velocity from the time duration.

15. A method according to claim 14 in which the velocity measuring is accomplished by attenuating each particle pulse by two known percentages of the maximum ampplitude and employing the elapsed time of particle movement between these two known percentages for defining particle velocity.

16. Apparatus for measuring the length of particles of substantially uniform cross-section which have been electronically scanned by a Coulter type of particle scanning aperture arrangement that generates a particle pulse for each scanned particle, said apparatus comprising: means for measuring the time duration that each particle pulse exceeds a known percentage of its maximum amplitude, said measuring means including means for defining the same percentage value for all particle pulses, and means for converting said time duration to a signal parameter which is a measurement of particle length.

17. Apparatus according to claim 16 which includes means for compensating for the velocity of the particles relative to the scanning aperture arrangement, said compensating means constructed to provide a non-linear response to the measured time duration for effectively decreasing the time duration measurements of particles which move at a lower velocity because of their relative lengths.

18. Apparatus according to claim 17 in which said converting means comprises means for generating a signal amplitude as said signal parameter, and said velocity compensating means comprises a pulse height analyzer constructed and arranged to be non-linearly responsive to the signal amplitudes.

19. Apparatus according to claim 16 in which said pulse duration measuring means comprises an element for establishing an electrical threshold level for defining said known percentage of maximum pulse amplitude.

20. Apparatus according to claim 19 in which said threshold element includes structure for presetting the threshold level based upon known parameters, such as cross section of the particles prior to the particle scanning.

21. Apparatus according to claim 19 which includes means for ascertaining the maximum pulse amplitude generated by a sample of the particles, and said threshold element includes structure for then setting the threshold level to a desired percentage of the ascertained maximum pulse amplitude.

22. Apparatus according to claim 19 in which said pulse duration measuring means includes pulse count frequency determinating means connected to said threshold element for ascertaining a threshold level related to said maximum amplitude and said threshold element includes structure for setting its level to a desired percentage of such maximum amplitude threshold level.

23. Apparatus according to claim 19 in which said converting means includes means for integrating said time duration and for generating a signal amplitude related to the length of each particle.

24. Apparatus according to claim 23 which includes means for compensating for the velocity of the particles relative to the scanning aperture arrangement, said compensating means constructed to provide a non-linear response to the integrated signal amplitude for effectively decreasing the time duration measurements of particles which move at a lower velocity because of their relative lengths.

25. Apparatus according to claim 16 in which said pulse duration measuring means includes means for attenuating each particle pulse to a signal level which is at said known percentage of its maximum amplitude.

26. Apparatus according to claim 25 in which said pulse duration measuring means further includes: means for detecting the maximum amplitude of each particle pulse and for feeding such maximum amplitude to said attentuating means, and means for comparing the attenuated signal level with the particle pulse waveform for defining as said time duration the duration which the particle pulse waveform exceeds the attenuated signal level.

27. Apparatus according to claim 26 which includes means for compensating for the velocity of the particles relative to the scanning aperture arrangement, said compensating means constructed to provide a response to the measured time duration for effectively decreasing the time duration measurements of particles which move at a lower velocity because of their relative lengths.

28. Apparatus according to claim 27 in which said velocity compensating means includes means for measuring the velocity of a particle at least once while it is being scanned by the aperture arrangement, means for converting the velocity into the same signal parameter to which the time duration was converted, and means for factoring the velocity from the time duration.

29. Apparatus according to claim 28 in which said velocity measuring means includes means for attenuating each particle pulse by a second known percentage of the maximum amplitude and means for employing the elapsed time of particle movement between the two known percentages for defining particle velocity.

* * * * *